though still other salts of phosphoric acid may be present in the compositions as described more fully below.

United States Patent Office 3,736,151
Patented May 29, 1973

---

3,736,151
DUST-FREE LEAVENING AGENT
Leo B. Post, New City, and Herbert J. Rosen, Yonkers, N.Y., and J. Howard Zeh, Houston, Tex., assignors to Stauffer Chemical Company, New York, N.Y.
No Drawing. Filed Jan. 6, 1970, Ser. No. 1,022
Int. Cl. A21d 2/02
U.S. Cl. 99—95
20 Claims

ABSTRACT OF THE DISCLOSURE

A novel dust-free leavening agent is provided containing sodium aluminum phosphate and a binder which comprises a non-toxic salt capable of forming a hydrate. Illustrative of the salts used as binders are dialkali phosphates, or alkali acid pyrophosphates, and more specifically, disodium phosphate, sodium acid pyrophosphate, aluminum sulfate or sodium aluminum sulfate. The novel leavening agent is substantially dust-free and is useful, for example, in self-rising flours.

BACKGROUND OF THE INVENTION

The use of compositions comprising sodium aluminum phosphate as a leavening agent is well known in the preparation of self-rising and pancake flours, muffin and biscuit mixes, cake mixes, frozen mixes, etc. Such compositions and uses are disclosed in U.S. Pat. 3,109,738, in U.S. Pat. 2,550,490 and in U.S. Pat. 2,550,491. The presence of sodium aluminum phosphate of the type described in the above mentioned patents provides baked goods having a whiter crumb color and better flavor than prior additives. The use of materials described in U.S. Pat. 3,109,738 yields oven products of consistently good appearance, free of any leavening after flavor and contributes a unique and noticeable improvement in the tenderness of biscuits, cakes, pancakes, pastries and other baked products. In addition, accidental variations in mixing uniformity of the self-rising flour are compensated for by the unusual buffering action of such leavening agents. Still further, these materials give more uniform baking response and inexperienced homemakers are assured of good oven products as measuring, mixing and baking are not quite so critical. Additionally, these materials provide improved tolerance to the amount of liquid and shortening used and to oven temperature. Doughs may be baked fresh, refrigerated or frozen, as desired. Unfortunately, there has been some criticism of the products containing sodium aluminum phosphate because of certain undesirable flow characteristics and dustiness. While numerous solutions have been advanced in an attempt to overcome these problems, no completely satisfactory solution was available prior to the present invention.

DETAILED DESCRIPTION OF THE INVENTION

The present invention provides a new and improved leavening agent which is characterized as dust-free, non-caking, and, in addition, possesses excellent flowability. This is accomplished by agglomerating a material comprising soluble, acidic sodium aluminum phosphate (SALP) in the presence of water and a suitable binder salt. The resulting material is then preferably dried and, if desired, admixed with additional constituents, such as monocalcium phosphate and tricalcium phosphate, in order to make the final leavening acid formulation.

The SALP which can be used in the compositions of the invention is a complex, acidic, soluble compound which may be represented generally by the formula:

$$M_xAl_yH_z(PO_4)_{7-10}.0-8H_2O$$

where M is an alkali metal selected from the group consisting of sodium, potassium, and mixtures thereof, and $x$, $y$ and $z$ are numbers of from 1 to 5, 2 to 4, and 11 to 17, respectively, with the sum of $x+3y+z$ numerically equal to the sum of the valences of the phosphate ($PO_4\equiv$) radicals, i.e. between 21 and 30. Also, M will comprise at least one gram atom of sodium. Non-hydroscopic potassium modified forms of sodium aluminum phosphate, where M in the above formula is both sodium and potassium, are disclosed in U.S. Pat. 3,205,073. The compounds may be in either a crystalline or amorphous form. The safety of baked products containing sodium aluminum phosphate is well-established, and sodium salts, aluminum salts, and salts of phosphoric acid are recognized constituents of foods leavened by baking creams, baking powders, and the like. Sodium aluminum phosphate has been included among the substances generally recognized as safe for food use, under buffers and neutralizing agents. Federal Register, Regulations, Title 21, Chapter I, Sub-Chapter B, Part 121, Subpart B, 121.101.

One particularly preferred form found suitable for use in the present invention is the crystalline compound of the formula $$NaAl_3H_{14}(PO_4)_8.4H_2O$$

disclosed in U.S. Pat. 2,550,490, and its stabilized form disclosed in U.S. Pat. 3,205,073. Of the various modifications, this compound (herein referred to as "SALP, tetrahydrate") furnishes the most desirable combination of stability and baking response.

Nevertheless, the other acidic SALP modifications may be used since they are excellent baking acids and demonstrate a relatively high degree of stability when used in the compositions of the invention. In this regard the compounds of the formulas $$Na_4Al_2H_{14}(PO_4)_8.H_2O$$

disclosed in U.S. Pat. 3,223,480;

$$Na_3Al_2H_{15}(PO_4)_8.2H_2O$$

and $$Na_3Al_3H_{12}(PO_4)_8.5H_2O$$

disclosed in U.S. Pat. 3,223,479, have been found suitable for inclusion in the novel compositions. Further, the dehydrated forms of SALP, e.g.

$$NaAl_3H_{14}(PO_4)_8.0-1H_2O$$

disclosed in U.S. Pat. 2,957,750; the amorphous compounds of the general formula $$NaAl_3H_{11}(PO_4)_7.5-8H_2O$$

(U.S. Pat. 2,995,421) and other species of sodium aluminum acid orthophosphates have utility at least to some degree, when used as acid-reacting components of the novel compositions, and, therefore, as used herein, the term "sodium aluminum phosphate" or simply "SALP" is intended to include all of the various crystalline or amorphous acidic modifications of the above compounds, The monocalcium phosphate (MCP) suitable for the present invention is the anhydrous form represented by the general formula $$Ca(H_2PO_4)_2$$

Because the final step in the preparation of this compound comprises heating to produce a coated product, it is sometimes referred to as heat-treated or coated monocalcium phosphate, anhydrous. It is a white granular free-flowing powder available in commercial quantities under various trade names. The individual particles of heat-treated monocalcium phosphate, anhydrous have a thin, continuous coating of a relatively insoluble phosphate which delays solution when contacting aqueous liquids. Products of this type are described more fully in U.S. Pats. 2,160,-700 and 2,160,232. When used herein, the term monocalcium phosphate or simply MCP is intended to refer to this anhydrous coated form.

Certain non-toxic salts capable of forming a hydrate are useful as binder salts in the present invention. By non-toxic salts, it is meant to include salts which are approved or may be approved in the future for use in leavening agents by the FDA. However, not all such salts exhibit the requisite combination of the properties for use in the present invention since certain salts undesirably alter the baking performance or the physical properties of the SALP. Suitable non-toxic salts for use in the present invention include sodium or potassium salts of phosphates and sulfates. Such binder salts are preferably used in amounts varying from about 0.1 to about 10% by weight of the agglomerated particles. Especially suitable binders include dialkali phosphates such as disodium or dipotassium phosphate, alkali acid pyrophosphate, such as, for example, sodium acid pyrophosphate or potassium acid phosphate and the like, or aluminum sulfate, sodium aluminum sulfate or the like. This latter class is found to be especially suitable since such salts do not impair the baking performance of the final product.

The binder salt is, preferably, prepared as an aqueous mixture for admixing with the acidic soluble sodium aluminum phosphate which is to be agglomerated. Preferably, the solution of water and binder contains at least about 0.5% of the binder salt. The ratio of amount of solid binder salt used to the acidic soluble sodium aluminum phosphate preferably varies between about 0.1:100 to 10:100 and most preferably from about 0.5:100 to 5:100. As previously indicated, the agglomeration must take place in the presence of water although the amount of water present does not appear to be critical. While the amount of water employed in the agglomeration step does not appear to be critical, it has been found important to dry the resulting agglomerating SALP in order to avoid caking of the agglomerates in the final packaged product. It has been found that drying the agglomerates to about 0.3% water or less on a weight basis (Ohaus at 20 over 20 setting) substantially eliminates caking of the final agglomerated product.

The agglomeration of the acid soluble sodium aluminum phosphate with the binder salt and water can be effected in any suitable agglomeration zone. A preferred agglomeration zone comprises a continuous V-blender (called a zig-zag blender) in which an aqueous solution of binder salt, such as disodium phosphate, is admixed and blended with the acidic soluble sodium aluminum phosphate. The agglomerates are preferably dried and screened to provide the product having a desired uniform size range. The preferred size range is particle size of about 60 mesh and about 325 mesh. The drying step is preferably effected at temperatures between about 100 and about 150° F. for a period of up to about 2.5 hours.

Where it is desirable to make products such as those described in U.S. Pat. 3,109,738 (e.g., actif. 8®) anhydrous monocalcium phosphate and tricalcium phosphate are blended with the agglomerated material subsequent to the drying step and the final product is then packaged.

Alternatively, it has been found in the practice of the present invention that anhydrous monocalcium phosphate can be blended with the soluble acidic sodium aluminum phosphate prior to the aforedescribed agglomeration step. The resulting product has been found to exhibit satisfactory physical properties, e.g., non-dusting, flowable, as well as excellent baking performance. The final product preferably contains between about 45 to about 75% by weight SALP, between about 20 to about 55% by weight anhydrous monocalcium phosphate, and between about 0.1 and about 10% by weight of binder. A most preferred product contains between about 60 and 70% by weight SALP, about 30 to 40% monocalcium phosphate, and about 0.5 to about 5% by weight binder, and between about 0.5 to about 3% tricalcium phosphate.

Having thus described the invention in general terms, reference is now made to specific examples which should not be construed as unduly limiting thereof.

EXAMPLE 1

Soluble acidic sodium aluminum phosphate (1–3–8) $(NaH_{14}Al_3(PO_4)_8 \cdot 4H_2O)$ in the amount of 3700 lbs. per hour is introduced to a continuous V-blender (zig-zag blender) and blended together with a solution containing 37 lbs. per hour of disodium phosphate and 184.73 lbs. per hour of water. The agglomerated particles formed in the blender are passed to a drying zone maintained at a temperature between 110–145° F. for about 2.5 hours in order to obtain a moisture content of about 0.3%, by weight (Ohaus moisture balance at 20 watts for 20 minutes). The agglomerated particles are then passed to a screening zone wherein particles of particle size of 60 mesh or finer are separated as the product fraction and particles larger than 60 mesh can be withdrawn and recycled, if desired.

The agglomerated particles of soluble acidic sodium aluminum phosphate and binder salts are non-dusting, free-flowing and can be employed to make a wide range of leavening agent formulations according to the needs of the industry or particular customers. These agglomerated particles are stable and non-caking in storage and are found to exhibit substantially the same baking performance characteristics as non-agglomerated soluble acidic sodium aluminum phosphate when incorporated into final formulations.

EXAMPLE 2

The dried and screened soluble acidic SALP particles produced in accordance with Example 1 are blended together with anhydrous monocalcium phosphate $$(CaH_4(PO_4)_2$$

introduced to a paddle blender in the amount of 1783.3 lbs. per hour and 55.73 lbs. per hour of tricalcium phosphate $3Ca_3(PO_4)_2 \cdot Ca(OH)_2$. The mixture is blended together in a paddle blender in order to produce a leavening acid formulation known as actif. 8 which, in this example, comprises about 32.1% anhydrous monocalcium phosphate, about 66.7% SALP 1–3–8, about 1% tricalcium phosphate and about .67% disodium phosphate. The tricalcium phosphate is employed in he final formulation as a source of additional calcium oxide in the final leavening acid formulation. The baking performance characteristics of the novel leavening agent containing agglomerated SALP material is essentially the same as the characteristics of the former leavening agents. However, the novel leavening agents are non-caking and substantially dust-free and exhibit extended shelf life.

EXAMPLE 3

In this example, 500 grams of SALP 1–3–8 are charged to a rotating chamber and sprayed with 50 milliliters of a 10% solution of aluminum potassium sulfate $$(Al_2(SO_4)_3 \cdot K_2SO_4 \cdot 24H_2O)$$

The chamber is rotated slowly by hand as the spray is applied. The material agglomerates into particles of about ⅛ to ¼" in diameter. The product is screened and a portion passes the 100 mesh screen. Dustiness is substantially reduced and flow properties improved by this procedure.

EXAMPLE 4

4020 grams of soluble acidic SALP 1-3-8 are mixed with 100.5 grams of anhydrous monocalcium phosphate and to this mixture 41.5 grams of tricalcium phosphate are added. The mixture is then agglomerated with 249.7 grams of 16.7% disodium phosphate solution in a V-blender. An additional 2010 grams of monocalcium phosphate are blended in with the aid of the V-blender. The contents are then dried and screened retaining only the particles of particle size of 60 mesh or finer. Particles larger than 60 mesh can be recycled to improved the product.

The final product is in the form of an agglomerate of a particle size between about 60 mesh and 325 mesh, or even finer particles. The product is characterized by excellent flowability. It flows like sugar and is practically dust-free. In addition, there is no noticeable loss in leavening properties.

EXAMPLES 5-11

The following examples illustrate the effects of moisture, the use of additional binders, and the results of baking tests of material agglomerated in accordance with the present invention.

The agglomerates prepared by use of such binders as disodium phosphate, aluminum sulfate $(Al_2)(SO_4)_3$ sodium aluminum sulfate or sodium acid pyrophosphate, were compared with actif. 8 as a control and the agglomerates containing any of the aforesaid binders were found to be significantly less dusty, flowed better and to give about the same leavening effect in the bake tests. A comparison of the test results comparing actif. 8 as a control and actif. 8 containing a suitable binder such as disodium phosphate or any of the other indicated binders is set out in the table bleow.

comprises admixing and blending with said leavening agent a mixture consisting essentially of water and a suitable non-toxic binder salt capable of forming a hydrate for a period of time sufficient to agglomerate said leavening agent, maintaining said agglomerated leavening agent in a drying zone to remove moisture therefrom whereby essentially dust-free, non-caking and flowable particles are produced, said binder salt being in an amount from about 0.1 to about 10 percent by weight of the agglomerated particles.

2. The process of claim 1 in which said binder salt is a sodium or potassium salt of a phosphate or sulfate.

3. The process of claim 1 in which said binder salt is a dialkali phosphate.

4. The process of claim 3 in which said dialkali phosphate comprises disodium phosphate.

5. A process of claim 3 in which said dialkali phosphate comprises dipotassium phosphate.

6. The process of claim 1 in which said binder salt comprises an alkali acid pyrophosphate.

7. The process of claim 6 in which said alkali acid pyrophosphate comprises sodium acid pyrophosphate.

8. The process of claim 6 in which said alkali acid pyrophosphate comprises potassium acid pyrophosphate.

9. The process of claim 1 in which said binder salt comprises aluminum sulfate.

10. The process of claim 1 in which said binder salt comprises sodium aluminum sulfate.

11. The process of claim 1 in which said binder salt is prepared as an aqueous mixture thereof and is then admixed with said sodium aluminum phosphate in a blending zone to agglomerate said materials.

12. The process of claim 1 in which said particles are maintained in said drying zone until they contain about 0.3% water or less on a weight basis.

13. The process of claim 1 in which the agglomerated particles are dried and screened to provide a product having desired size range.

EXAMPLES 5-11

TABLE

| | Analysis before agglomeration | | | Binder solution | | Final V-90 addition, gms. | Moisture content after drying, percent[4] | Percent +60 mesh | Test Results | | | |
|---|---|---|---|---|---|---|---|---|---|---|---|---|
| Example | SALP, 1,3,8 gms.[1] | V-90, gms.[2] | TCP, gms.[3] | Binder (gms.) | Water | | | | Bag compaction | Bake, specific volume | Dust level | Flow test, secs. |
| 5 | 4,020 | 100.5 | 41.5 | $Na_2HPO_4$(41.6) | 208.1 | 1,909.5 | 0.6 | | Caked badly | | | |
| 6 | 4,020 | 100.5 | 41.5 | $NaAl(SO_4)_2$(41.6) | 208.1 | 1,909.5 | 0.5 | | | | | |
| 7 | 4,020 | 100.5 | 41.2 | $Al_2(SO_4)_3$(41.6) | 208.1 | 1,909.5 | 0.6 | | Caked badly | 2.33 | Little | |
| 8 | 4,020 | 100.5 | 41.5 | $Na_2HPO_4$(41.6) | 208.0 | 1,909.5 | 0.3 | | No caking, 2 weeks. | 2.43 | do | 7-36 |
| 9 | 4,020 | 2,010 | 60.3 | $Na_2HPO_4$(60.3) | 301.5 | | 0.3 | | | | | |
| 10 | 4,020 | 100.5 | 41.5 | $Na_2H_2P_2O_7$(41.5) | 208.1 | 1,909.5 | 0.3 | | No caking, 2 weeks. | | Little | 8-64 |
| 11 | 4,020 | 2,010 | 60.3 | $Al_2(SO_4)_3$(60.3) | 304.5 | | 0.3 | | do | 2.31 | Nil | |
| Control | | | | Actif. 8 formulation[5] | | | | | do | 2.38 | Dusty | 55-116 |

[1] Sodium aluminum phosphate.
[2] Anhydrous monocalcium phosphate.
[3] Tricalcium phosphate.
[4] Drying is effected at a temperature between about 110 and 145° F. up to about 2.5 hours. (Ohaus Moisture Balance at 20 watts for 20 min.)
[5] The formulation was 64% sodium aluminum phosphate, 34% anhydrous monocalcium phosphate and 1% tricalcium phosphate.

The results in the table indicate that when the moisture content is in the 0.5 or 0.6% range, the resulting product is unsuitable as a leavening agent because of the caking. However, at the 0.3% level there is little or no sign of any caking.

A preferred actif. 8 formulation contains the following ingredients, in the indicated percentages, by weight:

|   | Percent |
|---|---|
| Sodium aluminum phosphate | 64 |
| Anhydrous monocalcium phosphate | 34 |
| Tricalcium phosphate | 1 |
| Disodium phosphate | 1 |

What is claimed is:

1. A method for agglomerating a leavening agent comprising soluble acidic sodium aluminum phosphate which 14. The process of claim 13 in which particle size range is between about 60 mesh and about 325 mesh.

15. The method of claim 1 in which said agglomerated particles are dried and then admixed with a material comprising anhydrous monocalcium phosphate to produce a leavening agent product therefrom.

16. A method for agglomerating a leavening agent comprising soluble acidic sodium aluminum phosphate and anhydrous monocalcium phosphate which comprises; forming said leavening agent by admixing soluble acidic sodium aluminum phosphate and anhydrous monocalcium phosphate, admixing and blending with said leavening agent a solution consisting essentially of water and a suitable non-toxic binder salt capable of forming a hydrate for a period of time sufficient to agglomerate said leaving agent, maintaining said agglomerated leavening agent in a drying zone to remove moisture therefrom whereby essentially non-dusting, non-caking, and flowable agglomerated particles are produced, said binder salt being in an amount from about 0.1 to about 10 percent by weight of the agglomerated particles.

17. The method of claim 16 in which said sodium aluminum phosphate is admixed with tricalcium phosphate and said monocalcium phosphate.

18. An agglomerated substantially dust-free leavening agent containing an active ingredients, by weight, from about 45 to about 75% soluble acidic sodium aluminum phosphate and between about 20 to about 50% anhydrous monocalcium phosphate and between about 0.1 and about 10% of a binder salt comprising sodium or potassium salt of a phosphate or sulfate.

19. The product of claim 18 in which said binder salt comprises disodium phosphate.

20. The product of claim 18 in which said sodium aluminum phosphate is present between about 60 and 70%, said monocalcium phosphate between about 30 and 40%, said binder comprises disodium phosphate between about 0.5 and 5%, and between about 0.5 and about 3% tricalcium phosphate.

References Cited
UNITED STATES PATENTS

| | | | |
|---|---|---|---|
| 3,041,177 | 6/1962 | Lauck et al. | 99—95 |
| 1,951,328 | 3/1934 | Fiske | 99—95 |

RAYMOND N. JONES, Primary Examiner

J. R. HUFFMAN, Assistant Examiner

U.S. Cl. X.R.

99—DIG. 4